(12) United States Patent
Gausereide

(10) Patent No.: US 8,761,580 B2
(45) Date of Patent: Jun. 24, 2014

(54) REAL TIME VIDEO INCLUSION SYSTEM

(76) Inventor: Stein Gausereide, Bergen (NO)

( * ) Notice: Subject to any disclaimer, the term of this patent is extended or adjusted under 35 U.S.C. 154(b) by 248 days.

(21) Appl. No.: 12/817,065

(22) Filed: Jun. 16, 2010

(65) Prior Publication Data

US 2011/0008017 A1    Jan. 13, 2011

Related U.S. Application Data

(63) Continuation-in-part of application No. PCT/US2008/087178, filed on Dec. 17, 2008.

(60) Provisional application No. 61/014,411, filed on Dec. 17, 2007.

(51) Int. Cl.
| | | |
|---|---|---|
| G11B 27/00 | (2006.01) |
| H04N 5/93 | (2006.01) |
| H04N 9/80 | (2006.01) |
| H04N 5/14 | (2006.01) |
| H04N 5/225 | (2006.01) |
| H04N 9/74 | (2006.01) |
| G06K 9/00 | (2006.01) |
| G06K 9/36 | (2006.01) |

(52) U.S. Cl.
USPC ........... 386/278; 386/239; 386/248; 386/280; 348/25; 348/169; 348/586; 382/103; 382/276; 382/291

(58) Field of Classification Search
USPC ............ 386/239, 248, 278, 280; 348/25, 169, 348/586; 382/103, 276, 291
See application file for complete search history.

(56) References Cited

U.S. PATENT DOCUMENTS

| | | | | |
|---|---|---|---|---|
| 5,566,251 | A | * | 10/1996 | Hanna et al. ................. 382/284 |
| 5,623,587 | A | | 4/1997 | Bulman |
| 7,203,380 | B2 | | 4/2007 | Chiu et al. |
| 2002/0152557 | A1 | * | 10/2002 | Elberbaum ..................... 8/405 |
| 2003/0108329 | A1 | | 6/2003 | Adriansen et al. |
| 2007/0133880 | A1 | | 6/2007 | Sun et al. |
| 2007/0226761 | A1 | * | 9/2007 | Zalewski et al. ................ 725/32 |
| 2008/0033803 | A1 | * | 2/2008 | McKenna et al. ............... 705/14 |
| 2008/0074424 | A1 | * | 3/2008 | Carignano .................... 345/473 |

FOREIGN PATENT DOCUMENTS

| | | |
|---|---|---|
| EP | 0755022 A1 | 1/1997 |
| EP | 1009166 A2 | 6/2000 |
| JP | 2004-165805 A | 6/2004 |
| WO | WO-2005076618 A1 | 8/2005 |
| WO | WO-2007035558 A2 | 3/2007 |

OTHER PUBLICATIONS

International Search Report for PCT/US2008/087178.

* cited by examiner

Primary Examiner — Daquan Zhao
(74) Attorney, Agent, or Firm — Venable LLP; Stefan J. Kirchanski

(57) ABSTRACT

A process and system that allows an end user to insert images into a video content so that the images appear part of that content. This allows a consumer to seem to be part of a video, and interact with the famous personalities in that video. A video content is produced and a first software program is used to insert place holding templates into the video content. The end user produces a video image satisfying the requirements of the inserted template, and a second software program composites the two video streams so that the end user's video image is inserted into the first video content replacing the templates. The system can also be used to insert advertising information into a background to create custom, personalized, "on the fly" advertisements and product placements.

14 Claims, 9 Drawing Sheets

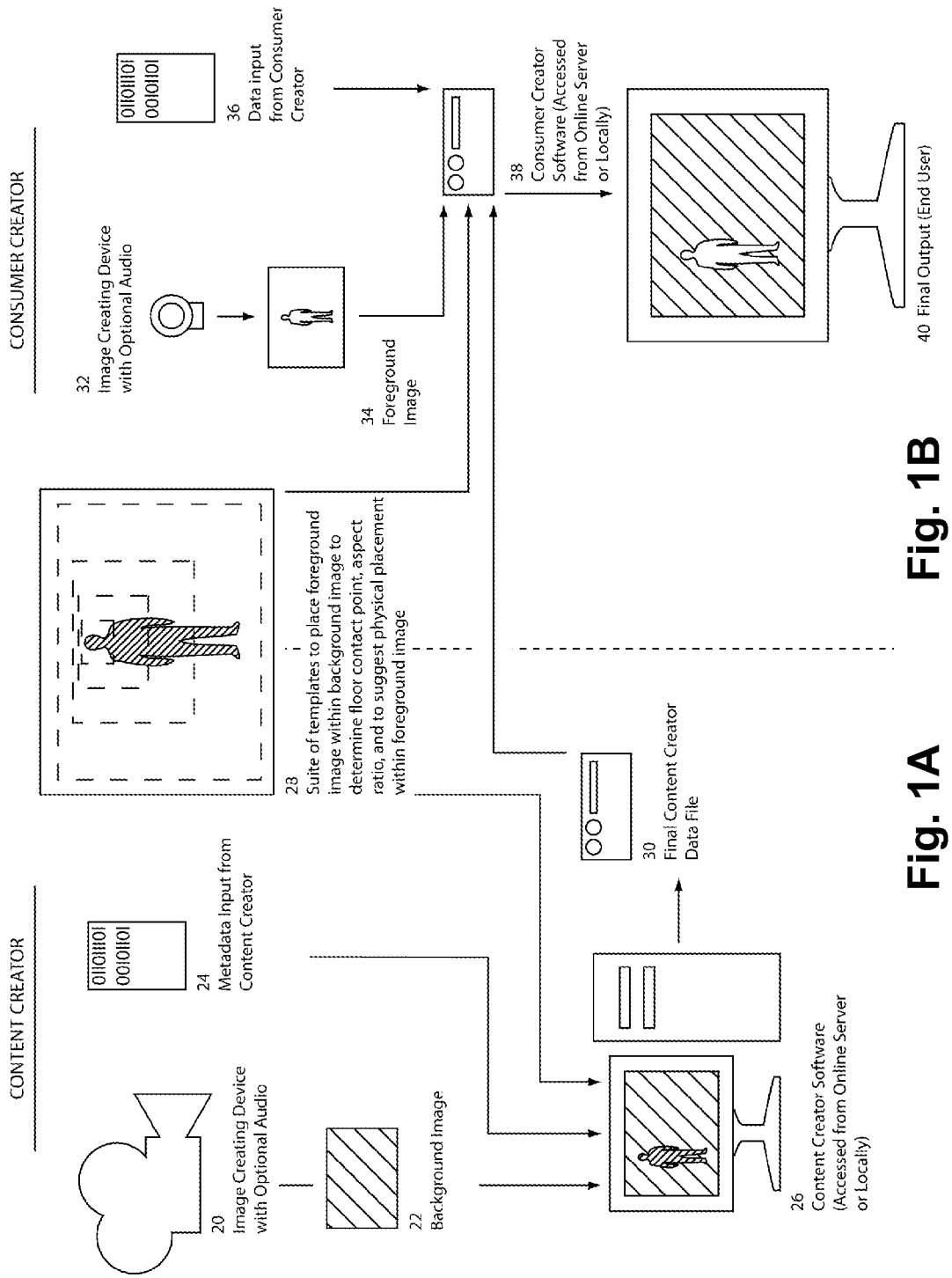

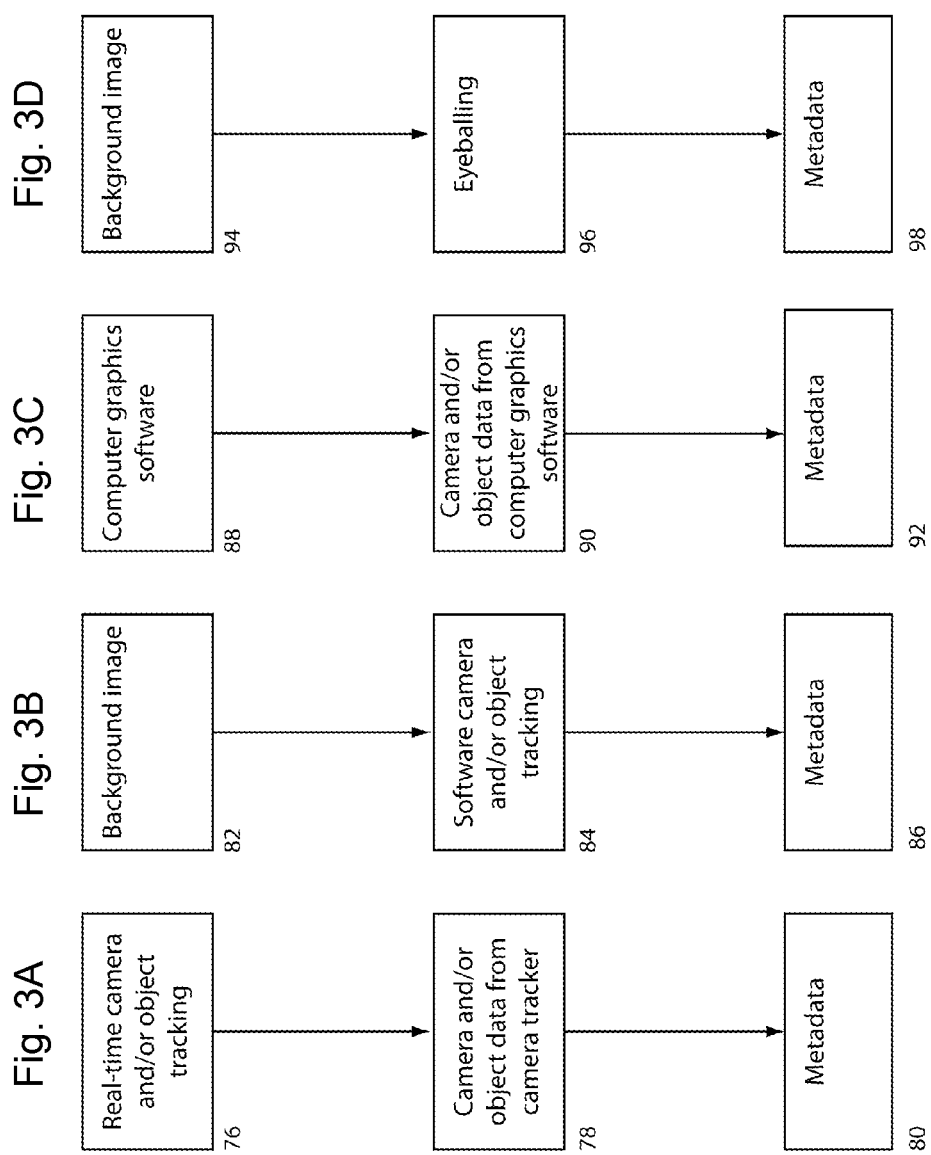

Template specified by content creator

Template selected by end user

How end user's foreground image would be positioned in relation to original template's position

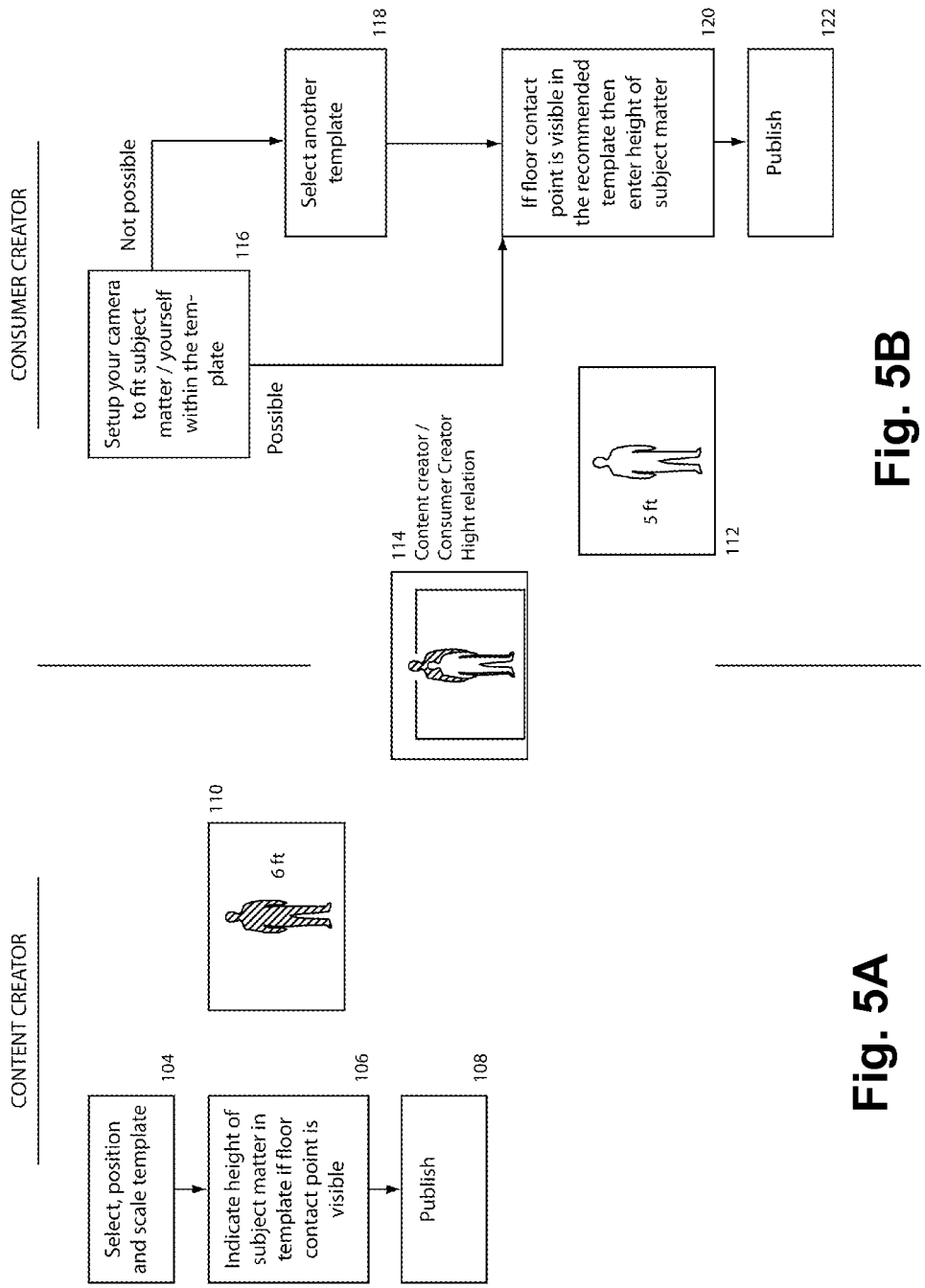

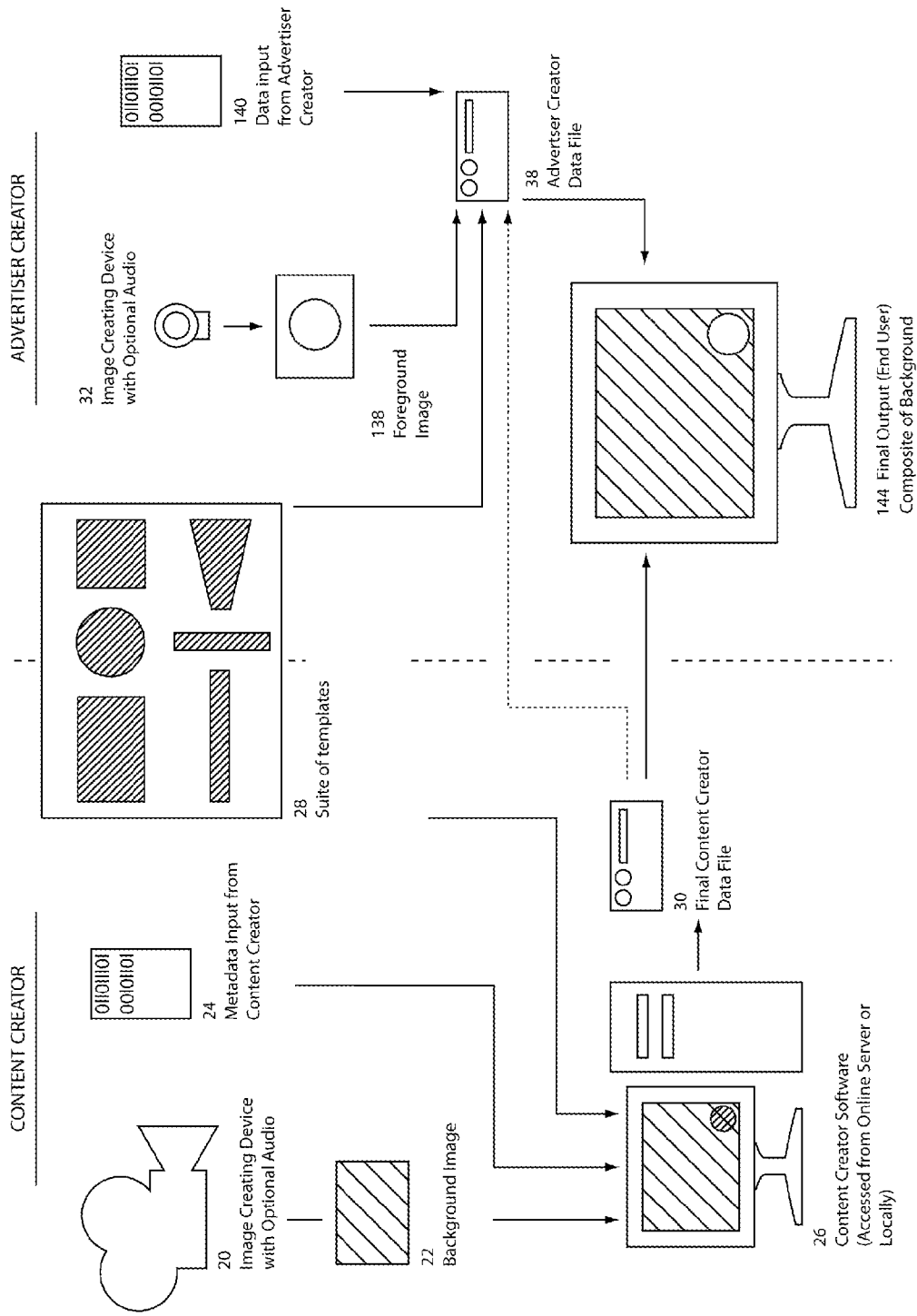

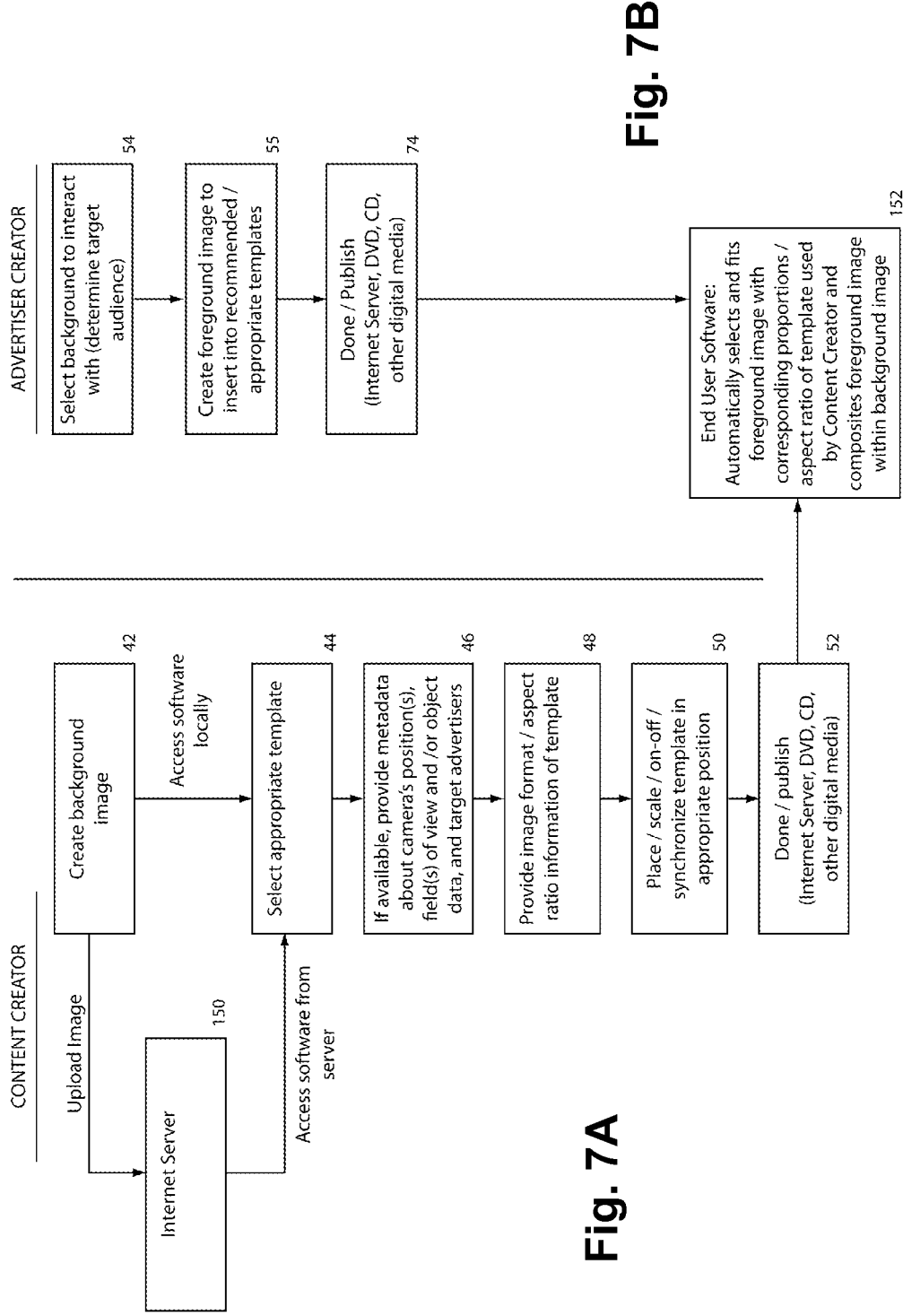

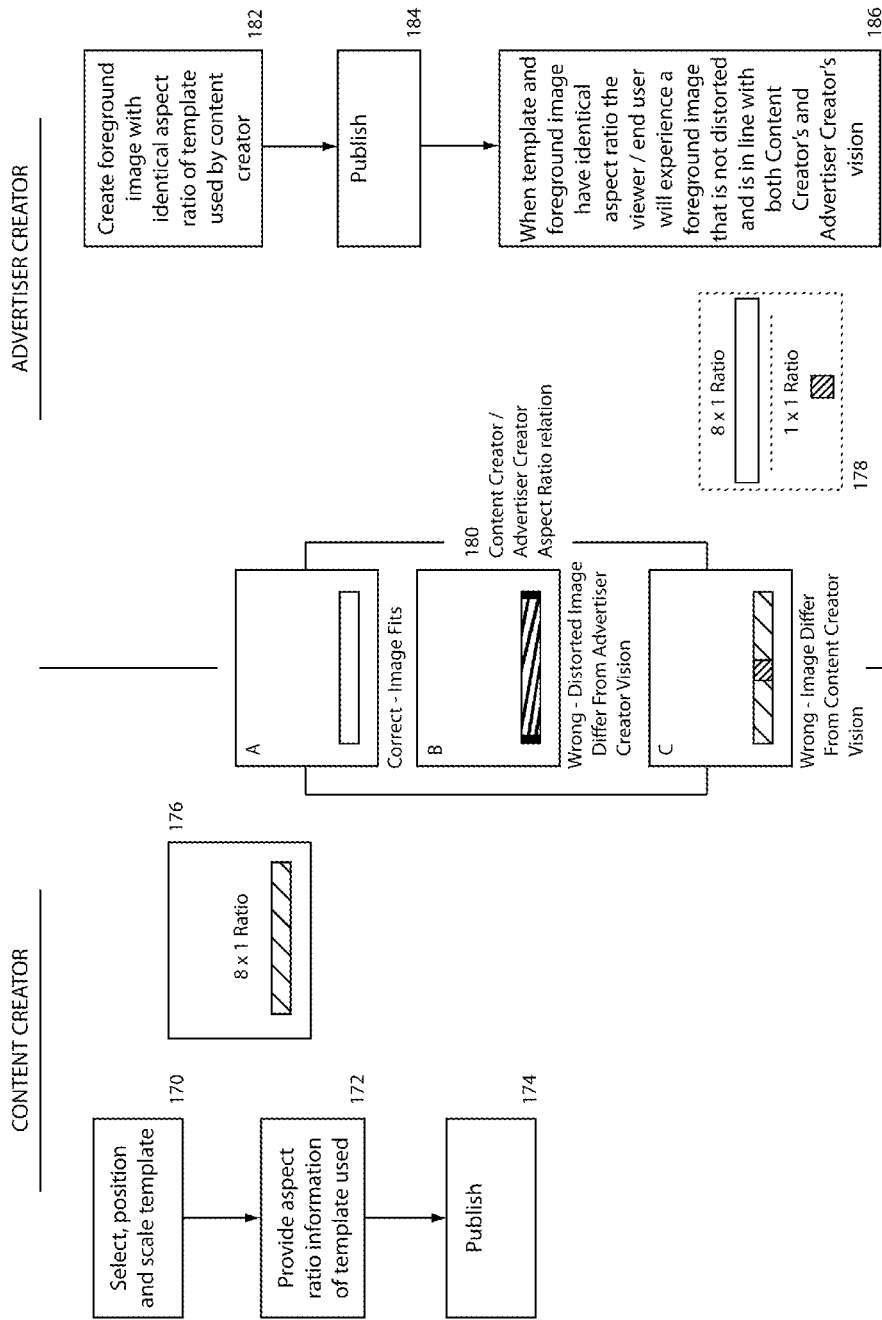

REAL TIME VIDEO INCLUSION SYSTEM

CROSS-REFERENCE TO PRIOR APPLICATIONS

The current application is a Continuation-In-Part (CIP) of and claims priority to PCT Application No. PCT/US2008/087178 filed on 17 Dec. 2008 designating the United States; which in turn was based on and claims priority from and benefit of U.S. Provisional Patent Application No. 61/014,411 filed on 17 Dec. 2007 all of which applications are incorporated herein by reference.

BACKGROUND OF THE INVENTION

1. Area of the Art

The present application concerns the art of making and using video images and still images and more particularly concerns a method and device that enables a first user to prepare images that permit a second user to more readily interact with the images.

2. Description of the Background Art

Traditional passive media industries such as television, the music industry, film studios and TV commercials are loosing out to interactive new media such as video games industry and the Internet. Although devices such as digital video recorders (DVRs) allow consumers to time shift content, they are passive and do not enable consumers to create their own new content.

Meanwhile, a growing number of tools that enable the consumer to become a content creator have become available. Digital still and video cameras allow ready image capture. The captured images are readily manipulated with powerful software residing on personal computers. The images can be combined and printed, displayed on television screens, burned on to DVDs and even emailed to friends and family. At the same time powerful digital music creation tools allow the consumer to create new music to combine with their digital images. Now any one can be a content creator. Even cellular telephones capture good quality still images as well as video. This created content is finding its way on to increasingly popular Internet sites. Thus, any consumer can be a "star" but this does not diffuse the public's desire to interact with media celebrities and/or profit from their own media creations. One way to do this would be by enabling creative content that allows the consumer to "interact" with celebrities. The current invention combines the trends in personal media creation with this love of celebrities. At the same time the invention provides a vehicle whereby the more traditional content creators and advertisers can take advantage of and profit from professional and personal media creation.

The present invention provides a communication vehicle which enables content creators and Rights Holders to provide a source image for the consumer, and anybody who would like to interact with the source image by means of a template system and a virtual set/image key system. Two, or more, separate video/image streams can be composited together in real-time at home or anywhere where one has access to the "content" video. The "content" video can be distributed in a variety of manners including over the Internet, DVDs, CDs and other digital media. The system allows the use of metadata in the "content" video that describes what the camera did while the shot was being made as well as information about how a foreground video/image should be combined with the shot using a template system. The resulting composite produces a convincing illusion in which the user/subject seems to be interacting live with the "content." For example, assume that a video of a rock concert is available on the Internet. The user captures his or her own image using a computer (which includes a variety of computing devices including personal computers and game consoles) connected video camera. This image of the user-consumer is combined with the "content" video using real-time software to produce a final video image where the user appears to be present in the rock concert video. This produces a recordable real-time video-in-video interaction of professional or amateur made digital video content ("the Content (or background) Creator") and consumer's digital video content ("the Consumer (or the foreground) Creator"). Similarly, for advertising purposes images can be readily adjusted; a billboard in movie or a video game might show a Coke ad in America and a Nike ad in Europe; teenage girls could receive a different advertising subject than teenage boys, etc. The same applies to the very talented amateurs out there who get millions of hits on their Internet posted consumer generated videos. Using the present invention, they could sell advertisement space within their own videos. Advertisements could be seamlessly and creatively integrated with the original content without being intrusive or disruptive and without interrupting the viewing experience.

This real-time process enables an advertiser and a consumer's video-in-video/image-in-image interaction with live broadcast, as-live broadcast, locally stored video files, computer games and video conferencing. The consumer or advertiser is allowed to interact with a wide range of Entertainment Programming (broadcast, feature films, commercials, music videos, TV series, "webisodes", online gaming and consumer generated media), or educational programming such as dance lessons, music lessons, singing lessons, acting lessons, medical training, etc. While the implementation described below is very much a consumer application, the invention can also be used as an educational tool, as a scientific tool as well as an advertising and product placement tool.

SUMMARY OF THE INVENTION

There is a long felt need for applications that allow a consumer to interact in some way with an idol or a star. An application that would allow consumers to interact with commercial content again and again and be able to share the outcome with anybody would address a need that has so far been completely unsatisfied. Likewise, there is currently no good way for advertisers to readily add advertisements to consumer and professionally generated video content. This would potentially change the way a lot of media content will be created and distributed in the future creating an opportunity for the likes of advertisers and commercials, as well as the music, game and film industry producers to control revenue streams for the content created in the new media distribution models.

There are opportunities for stock photo and video partners as consumers seek the perfect backgrounds for their own music videos or create their own "look and travel the world" projects while actually remaining at home. Apart from consumers the present invention is useful to the education community by enabling participation in music lessons, dance lessons and physical training, to name a few applications. In medicine the invention enables ready insertion of sign-language into any video as well as role playing for psychiatric treatment. In the prison setting the invention enables communication with remotely located people making them seem present to facilitate reinsertion into society. As a product placement and advertising tool the invention may prove lucrative to both advertisers and content creator alike. The invention also allows the end-user to upload an image of him/herself and apply it to a computer game character and therefore participate in the game as themselves for others to see. This takes custom avatars to a new height without necessitating a rewriting of the game software.

The invention makes use of a "commercial" video stream prepared by the "Content Creator" and a video stream produced by the consumer (the "Consumer" video) which is readily combined with the Content Creator video. The inventive process makes a composite video that can be recorded (Content Creator permitting) in real-time and includes the consumer talent (who or what is composited) in a resulting video that makes the Content Creator's content unique in a plurality of multiple versions—each consumer video (Content Creator video plus Consumer video) creates a new personalized version. These unique new videos can be uploaded to e.g. the Internet and mobile devices for others to see.

The real-time interaction is provided by a Consumer Creator software application accessible either through a computer or equivalent, like a game-engine or a setup box. The software application can be a relatively simple two dimensional (2d) system where the compositing is relatively fixed in 2d space, or the software has 3d capabilities so that the composited image moves in 3d space with the movement of the Content Creator's camera thus giving a much more convincing illusion.

The Consumer Creator software application is able to composite, in real-time, a local video stream or image file, e.g. from a web-camera, or an external feed, e.g. from the internet, with an external video feed or a locally stored video file. The video files are combined by means of the software application that is capable of, in real-time, handling two or more layers of video and/or images, 2d and 3d objects, text, and camera data streams and compositing the local video stream/image by means of superimposing or image keying.

DESCRIPTION OF THE FIGURES

FIG. 1 is routing diagram showing an overview of the inventive system with FIG. 1A showing the content creator and FIG. 1B showing the consumer creator;

FIG. 3 is a series of flow diagrams illustrating the steps in providing metadata with FIG. 3A showing camera metadata, FIG. 3B showing camera-background image metadata, FIG. 3C showing computer graphics metadata and FIG. 3D showing "eyeballing"-background image metadata;

FIG. 5 is an explanation of the use of height information with FIG. 5A showing the content creator steps and FIG. 5B showing the consumer creator steps;

FIG. 6 is a routing diagram of the invention used for advertising purposes with FIG. 6A showing the content creator and FIG. 6B showing the advertising creator;

FIG. 7 is flow diagram (similar to FIG. 2) showing the process used for advertising purposes;

FIG. 8 is a diagram explaining the use aspect ratio and image format with FIG. 8A showing the content creator aspect and FIG. 8B showing the advertiser creator aspect.

DETAILED DESCRIPTION OF THE INVENTION

Figures 2A, 2B:
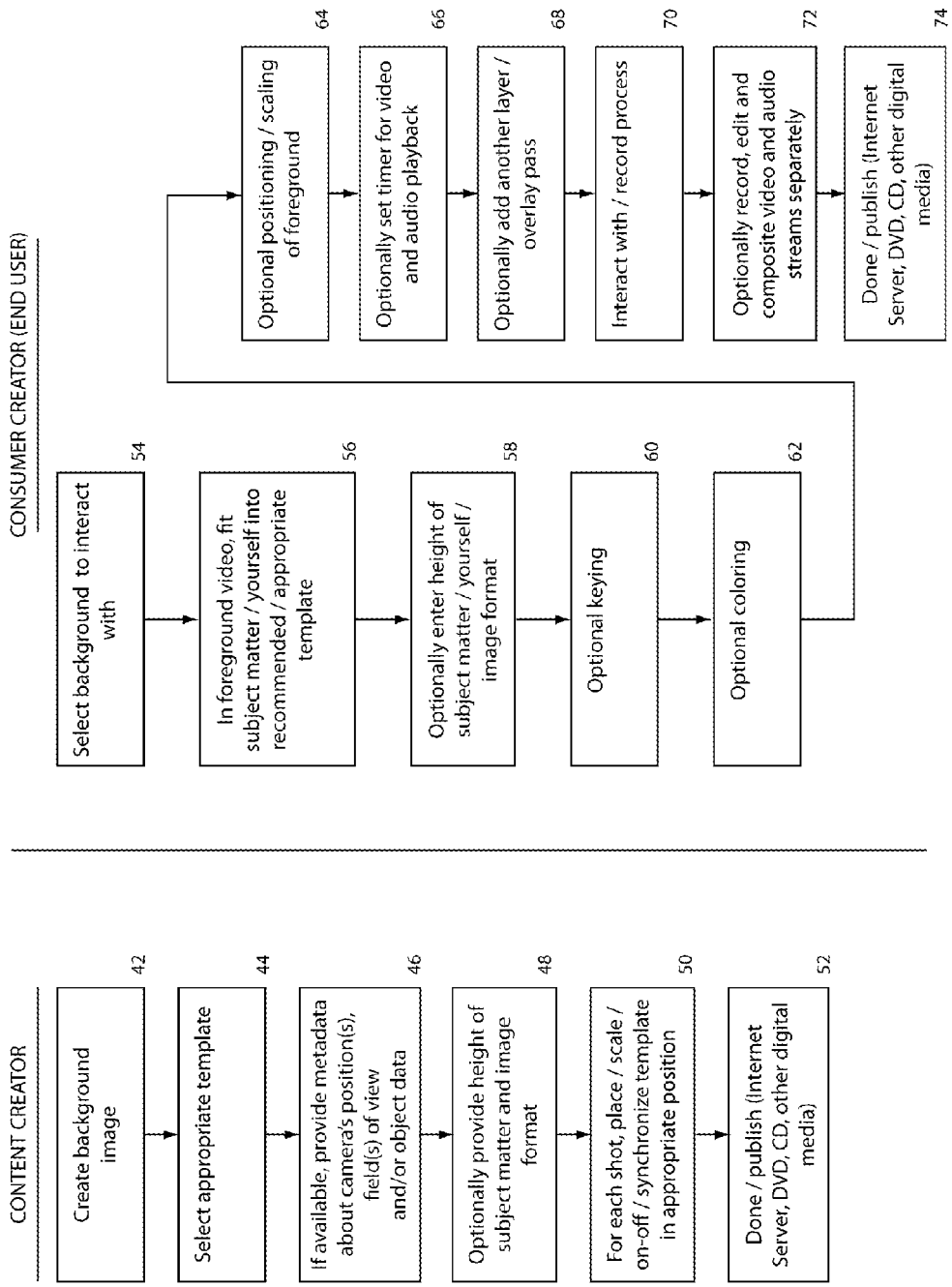
FIG. 2 is flow diagram showing the steps in the process of the invention with FIG. 2A showing the content creator steps and FIG. 2B showing the consumer creator steps.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a system for providing video content into which consumer video content can be readily inserted as well as the tools to make such insertion.

FIG. 1 and FIG. 6 show overviews of the entire process. FIG. 1 shows the version of the system where consumer content (FIG. 1 B) is combined with the Content Creator video (FIG. 1A). FIG. 6 shows advertising content (FIG. 6B) being inserted into the Content Creator video (FIG. 6A). As already explained a Content Creator that creates video content into which a Consumer Creator ("foreground" creator) inserts his or her video/image content to create a combined video in which the Consumer Creator/subject appears to be part of the original Content Creator video. FIG. 1 is divided into a Content Creator side (FIG. 1A) and a Consumer Creator side (FIG. 1B) to clarify what happens in each part of the process. First, the Content Creator uses an image creating device 20 to capture the basic video image. The drawing shows a camera as the image creating device 20, but any system of video creation including computer or traditional (hand drawn) animation and ordinary still images as well as still images with generated motion and panning effects (e.g., Ken Burns effects) can be used.

Digital video and image formats are usually coded as RGB but may sometimes be coded as RGBA, where the A stands for Alpha. This means the video includes a Key/Alpha/Digital Matte channel in addition to the usual Red, Green and Blue channels. Video with an alpha channel is important when the content creator, for example, uploads a video including an alpha channel where a person (or some object) is in front of a billboard into which the content creator wants to place an advertisement. Including the alpha channel will make it appear that the advertisement is behind the person and occupying the space of the billboard. The same approach applies for keying out the foreground audience in a concert video so an inserted image appears to be behind the audience and on the stage with the rock band. An alpha channel can be produces in several different ways—for example, rotoscoping: In the visual effects industry, the term rotoscoping refers to the technique of manually creating a matte for an element on a live-action plate so it may be composited over another background. There are also ways of creating alpha/matte channels in real-time, including chroma key, pattern recognition, etc.

The image creating device 20 creates the background image 22 into which the Consumer Creator will ultimately insert an image produced with a second image capturing device 32 (as in the case of capture device 20, any system of video creation can be used). The background image video 22 is then processed by a computing device (such as a personal computer or a game console) running Content Creator software 26. The software 26 can be resident on the local computer or can be accessed from a server—in that case part or all of the file manipulation can occur on a remote server computer). This software 26 allows the Content Creator to process the background video 22 to either include direct metadata 24 (camera angle, position, etc.) or to derive such metadata from the background video 22. The Content Creator software 26 also allows the Content Creator to embed a template 28 into the video content. The template 28 is a reference to where and how the Consumer Creator's video image will be inserted into the Content Creator video 22 (FIG. 6, 126). The template 28 is understood by both background (Content) software 26 and foreground (Consumer) software 38 and shows up as an outline, a shadow or 3d object in the background video 22. Controls allow the Content Creator to move the template 28 about from scene to scene, and decide how, when and where it will appear to achieve the most realistic and best creative position for the Consumer (foreground) Creator video image in each scene/shot, Various size templates (full body, upper body close-up, rectangle, square, circle, 3d objects, etc.) are available to allow the Content Creator to select the template view that is most appropriate to the video. The example uses the template to place a "foreground" image, but the template can also control placement of "background" image or images according to the desires of the Content Creator. In the case of advertising (FIG. 6) the templates 28 will often be shaped to insert product images or messages.

For example, if the background video 22 shows a performing rock band on stage, a full body template the same size as the performers would be appropriate. This is then positioned on the stage next to the other performers. If the video 22 then cuts to close-up view of the performers, the template is then moved and scaled into position and appears as an upper body close-up for that sequence. The Consumer Creator software 38 alters the inserted Template 28 appropriately based on the Metadata 24 information, provided by Content Creator, to create the illusion of camera motion and switching to the Foreground image 34 which is actually produced by a single (usually fixed) image capture device 32. The Consumer Creator can then view the altered template and "fine tune" its position if necessary. Positioning includes not only where but when in the image stream the template appears. The final content creator data file 30 contains the original background video 22 along with the embedded template(s) and appropriate metadata. This is then distributed to the Consumer creator by DVD or Internet or any other appropriate distribution method.

The Consumer Creator also has an image creating device 32, e.g. a video camera, interfaced to a personal computer or appropriate computing device. The Consumer Creator/End User can play the Final Content creator data file (video) 30 on a personal computer/computing device running Consumer Foreground Creator/End User software 38. (Again, this software may be obtained from a remote server and some or all of the manipulations may occur on a remote computer). This software allows the Consumer (Foreground) Creator to view the background image 22 and see the position of the template 28 within that video. In instances where the final Content Creator data file 30 is to use the template for product placement or advertising (see below) it may not be possible for end user to interact with these video files. Where the data file 30 is set up for interaction and there is a choice of possible templates encoded in the data file 30, the Consumer Creator is able to select the template that is most appropriate to his or her space and camera set up. The Consumer (Foreground) Creator software 38 is able to accept a foreground image/video 34 captured by the image creating device 32 and combine it with the final video 30 using superimposing or keying to insert or composite a foreground image into the "place holder" position created by the template.

Keying is a well-known process involved in superimposing or combining two or more image or video streams. In graphics, superimposition or "superimpose" is the placement of an image or video on top of an already-existing image or video, usually to add to the overall image effect, but also sometimes to conceal something (such as using the left side of the screen for the background image and the right side for the foreground image, also known as split screen). Keying is the process whereby the portion of one video image is isolated from its background so it can be composited with or combined into another image. The most commonly used key is chroma key. Chroma key is a technique for blending two images, in which a color (or a small color range) from one image is removed (or made transparent), revealing another image. This technique is also referred to as color keying, color-separation overlay (CSO), green-screen and blue-screen. It is commonly used for weather forecast broadcasts, wherein the presenter appears to be standing in front of a large weather map while actually standing in front of a blue background or green background.

The results of video compositing are similar to the older "blue-screen" process used in motion pictures where an actor was photographed against a blue screen and the actor's image was subsequently inserted into another scene. This photographic process is exceptionally complex involving the production of "photographic masks" to permit multiple printing on photographic film.

The keying-compositing system is really much simpler than the photographic system because of the raster nature of a video image. For each scan line that composes the image, an electronic switch takes video data from the background image for so long as the keying signal is in one state (for example indicating that the scan from the foreground image is showing the keying color). Whenever the foreground scan stops showing the keying color, the keying signal changes state and the electronic switch now takes the video data from the foreground image. This way the images are knitted together scan line by scan line with no need for photographic masks or other similar complexities. The illusion is that an underlying (background) image is "uncovered" in certain select areas. One example of Chroma Keying is to break each pixel down into its red, green, and blue channels and then these values will be converted into the hue, saturation, and value color space. Using a minimum and maximum hue it can then be determined if the pixel is meant to be transparent or not. There are a number of other ways of producing a keying signal. These include "luminance keying" where the keying signal is based on the brightness and darkness characteristics of the foreground image, e.g. each pixel will be converted into black and white and the resulting value will be used in further calculations to determine transparency. The final result will retain the color of the original pixel. If the user has specified a white background then any pixel that has a value greater than a certain limit will be transparent. If the user has specified a black background then any pixel that has a value lower than a certain limit will be transparent. In the case of "difference keying" the foreground image is analyzed first without the subject present and then with the subject present. Objects present in both analyses is determined to be background. The difference keying process requires that the camera will never move from its original position throughout the keying process since the user will take a 'clean plate' before beginning. A clean plate is a shot of just the background without any element that must remain opaque. This clean plate is saved in memory. For each frame the computing device will grab a new image from the image creating device and subtract the color channels each pixel of that image from the corresponding color channels in clean plate image. If sum of the absolute values of the subtractions is less than a specified range then the pixel is made to be transparent. In simple words, if a pixel is roughly the same color as it was in the clean plate then the pixel is made to be transparent.

The Consumer ("Foreground") Creator software 38 performs the keying function on the foreground image 34 and then inserts the keyed image into the position of the place holder template. Recall that the Creator metadata 24 allows the template to appear and to be moved and transformed according to template and camera angle, position, etc. The Consumer Creator software 38 transforms the superimposed or keyed image so that its position and aspect moves according to the original camera and its angle. To enhance this processing the Consumer Creator software 38 may require Consumer Creator metadata 36. This metadata may contain a wide range of information concerning the camera, lens and camera position used by the Consumer Creator to capture the foreground image 34 such as height of the camera and detail of the field of view. In scaling the images optimally it is advantageous for the software 38 to be aware of the size or height relationship of the foreground image 34 versus the size of the template inserted in the final video 30. For example, in the rock band video mentioned above, the average performer might be 6 feet tall so the inserted template is positioned to represent a 6 foot person. The Consumer Creator software 38 will scale the consumer foreground (keyed) image 34 to fit into the embedded template. This works fine if the person in the foreground image 34 is about 6 feet tall. However, if this person is only 5 feet tall, the inserted image will be excessively magnified and the result will not be realistic. By inputting the height information of the foreground image 34 this error is avoided and a realistic result will occur. Therefore, this is an important piece of information to be included in the Consumer Creator metadata 36.

The Consumer Creator software 38 does the keying and compositing in real time so that the Consumer Foreground Creator or End User is able to view the subject (often himself or herself, product placement or advertising) on the computing device monitor (final output 40) actually interacting with the background image 22 based on the additional Metadata 24 and combined in the Final content creator data file 30. Not only can the Consumer Creator perfect "moves" in response to the video image, but the Consumer Creator can also (Content Creator permitting) adjust the metadata 36 to give the most realistic responses.

The Consumer Creator Software 38 also acts as a video recorder so that the performance can be saved for upload to online services, emailing or even burning onto a DVD or other recording medium (again, Content Creator permitting). Where the final content creator data file 30 includes sound 20 it is also possible for the system to include the user's sound in the final product. In the case of a rock performance, the final Content Creator data file 30 can include a performance lacking a particular vocal track or instrument track. The Consumer Creator then sings or plays an instrument and the Consumer Creator software 38 blends this audio with the audio from the final content creator data file 30. In the case of singing, the Consumer Creator software 38 can display the appropriate words (part of metadata in final data file 30 and direct the user's input singing in the same way as karaoke devices.

An important part of the present invention is how the Content Creator treats the video data into which the user's image will be composited. The Content Creator may, or may not, include metadata and information about the positions and angles of one or more objects that are moving in the background image 22 (as well as timing information as to when, in the video stream, the object appears). Further; the Content Creator may, or may not, include metadata and information about the perspective of the camera and lens that was used to shoot the content. When the Content Creator includes camera information or similar metadata, this greatly facilitates the placement of the Consumer Creator's video feed inside of the Content Creator's video feed with optimal perspective. Original camera moves will then be accounted for and the Consumer Creator's video feed will then move in sync with the Content Creator's camera moves. It will be apparent to one of skill in the art that the background image can be the Consumer Creators captured image, and the keyable foreground image is then provided by the Content Creator. This allows one to create the illusion of a celebrity visiting and being present in one's living room. The Content Creator generally has control over whether the images supplied by the Consumer Creator are either the background or the foreground image when the video streams are combined.

The camera metadata information can be captured live on set by calculating and tracking the camera moves in real-time utilizing available hardware and software tracking systems, or the data can be created in post-production by using computer software that tracks the camera position and calculates the correct perspective at each point in time. Such software can be included in the Content Creator Software 26. All of the metadata data are included within the Content Creator's video 30 in a format usable/shared by the Consumer Creator software 38.

In the optimal case there are four types of information contained in the metadata that the end user receives:

1). The background (or foreground) image/video—The Content Creator specifies an image or video to be used in the compositing process. The actual image or a reference to it is included in the metadata.

2). Recommended template—The Content Creator selects a template into which the Consumer Creator fits his/her material (either foreground or background). The templates represent different types of camera shots such as a tight shot, medium shot, or wide shot. The template may also represent a person or other type of subject, e.g. a 2d or 3d object, a drawing, a picture, an advertisement, an illustration, a text or a 3 dimensional computer model. The actual template or a reference will be included in the metadata.

3). Height of the subject—This indicates how tall the subject is for the recommended template. The height given is not the height of the portion of the subject that is shown. Rather, it is the height of the entire subject from the floor contact point to the top of the subject. These data allow the Consumer Creator software 38 to automatically scale the foreground image 34 to maintain the proper height relationship between the foreground 34 and background images 30. Scaling of the Consumer Creators foreground image 34 is from the floor contact point or from the top of the subject. Information about image format and aspect ratio of the template 28 may also be included to maintain correct proportions of the foreground image 34 that is replaced by, or inserted into, the Template 28.

4). Location, orientation and timing of template—The Content Creator positions the selected template in such a way that the Consumer Creator's subject looks as if it fits into the background image 22 to produce a realistic final output 40 that comports with the Content Creators creative vision. There are at least three ways that the location and orientation of the template could be specified. If camera and/or object metadata are available, then 3d coordinates can be specified for the template location in each image frame. Rotational data and scaling information can also be included. Camera metadata include, but are not limited to, the camera X, Y, and Z coordinates, the camera's pan, tilt, and roll angles, and the camera's field of view. Object metadata include, but are not limited to, the object's X, Y and Z translation and rotation coordinates and X, Y and Z scale coordinates. If the background image is a moving image, then camera data may be/are given for each frame. If the background image has moving objects, then object data may be/are given for each frame of the tracked object. If camera or object data are not available, then for each frame the Content Creator can insert 2d coordinates for the four corners of the template polygon into the metadata. These coordinates can be arrived at by a process of pixel or plane tracking or through manual input and allow the Consumer Creator software 38 to transform the foreground polygon into proper perspective. If the camera doesn't move during the shot or if it doesn't matter to content creator, then the scale as well as the 2d and 3d positions of the template can be manually inputted and included just once in the metadata. Timing as to when the template appears and/or disappears is also controlled by the Content Creator.

FIG. 2 takes the overall workflow of FIG. 1 and displays it in the form of a process flow diagram. On the left side of the figure (FIG. 1A) is the process followed by the Content Creator. In a first step 42 "Create Background Image" the Content Creator creates a background image (video). When the image is perfected and published, it will become the background to be chosen for interaction by the Consumer Creator (end user). In a second step 44 "Select Appropriate Template" the Content Creator selects an appropriate template that best represents a subject within the frame of the template, e.g., full figure, medium, medium close or close-up. In addition, templates are available that correspond to the format of the image (4:3, 16:9 or other appropriate video/image proportions as explained in FIG. 8 and FIG. 9). In a third step 46 "Metadata" the Content Creator provides and/or selects metadata (to the extent it is available) describing the background image's object and camera position(s), timing and/or field(s) of view throughout the background image's duration. This can be accomplished by using a variety of available techniques such as real time camera and object tracking, camera/animation data from computer graphics software, software camera/object tracking or eyeballing (see FIG. 3). It will be appreciated that the quality of the final results will usually be enhanced by providing metadata. In a fourth step 48 "Input Height Information" the Content Creator can provide optional information about the height of the subject allowing software to automatically adjust position and scale of foreground image based on height input. In a fifth step 50 "Place, Scale, on-off and Synchronize Template" the Content Creator places and scales the template for each camera shot in an appropriate position to best fit content creator's creative vision, such as into the correct perspective of the background image and how and when to appear on and off. If needed, the Content Creator synchronizes the camera data to the camera movement of the background image to make the later added foreground image play in sync with the background image. It will be apparent that if the camera position is static, essentially no synchronization will be necessary. However, if the camera moves around, synchronization will be required so that the inserted template tracks the camera moves. Synchronization is also needed if the foreground image is made to track an object in the background image. In a final sixth step 52 "Publish" when the Content Creator is satisfied with the video, it is published to make the background image and metadata available for the end user and foreground image creator. As mentioned above, publishing can involve distribution by means of any media type such as Internet, 3G, CD and DVD.

The right-hand side of the figure (FIG. 2B) shows the overall process followed by the Consumer Creator. In a first step 54 "Select Background Image to Interact With" the Consumer Creator chooses a background video/image to interact with from available content on his/her computing device. The choice is governed by the interests of the Consumer Creator and what type of activity the Consumer Creator is prepared to perform. In a second step 56 "Fit to Template" the Consumer Creator adjusts the camera/foreground image so that the user's image in the foreground video/image will fit properly into the selected template. Recall that the Final Content Video 30 contains the templates suggested by the Content Creator to ensure ideal framing of the subject within the frame of the template, e.g. full body. However, in the case that it is not possible to fit the subject into the recommended template due for instance to the end user's limited space at home, the end user can choose a template that better fits what their image creating device can actually capture. In a third step 58 "Optionally Provide Height Information" the Consumer Creator can enter height of the subject thereby allowing the software 38 to scale correctly and automatically fit the subject in the scene maintaining the correct height relation set up by Content Creator. For example, if the Content Creator based the template on a person six feet tall and the subject is only five feet tall, then the software will automatically adjust the size and position of template to maintain floor contact point and height relation. As already explained, the height information is used during camera movement to maintain realistic size relationships. However if the Content Creator recommends certain templates such as a medium close framing for the shot, height information, even if input, may not be used because if a shorter subject is rescaled, part of the subject might appear outside of the boundaries of the screen.

In a fourth step 60 "Optional Keying" the Consumer Creator (AKA end user) has the option to either superimpose the foreground video over the Content Video 30 by leaving it fully opaque or to key the foreground video by using a variety of available techniques, such as chroma keying that removes a background color behind and around the subject and replaces it with the background image. It will be apparent that in almost every instance keying will be used because it produces a more realistic illusion that the foreground image is actually part of the Content Video 30, however if template is used as advertisement superimposing the image opaque (with transparency options) will in many cases be most correct and not possible for the End User to change. Superimposing the image opaque also works well if the process is set up to do straight camera cuts, e.g. a monologue in a movie where there are straight cuts between consumer creator's full screen image to the movie character's full screen image. In a fifth step 62 "Optional Coloring" the end user has the option to color correct the foreground image to match more closely the colors of the background image. For example there might be instances where the background was shot in black and white and the end user could then make the foreground video black and white as well or where the background was shot at sunrise or sunset and has a very warm color balance in which case the foreground image must be warmer in color to match the background.

In a sixth step 64 "Optional Positioning/Scaling of Foreground Image" the end user has the option to move, scale and crop the foreground image around in the background; i.e., move themselves into more prominent view. This may or may not depart from the creative vision of Content Creator and might add creative vision for the end user. In a seventh step 66 "Set Video/Audio Delay Timer" the Consumer Creator/end user is able optionally to delay the start of video and audio of the background image. This could be used to give oneself ten seconds to get ready to interact with the Content Video 30, and also to make sure the foreground action is in sync with the background action once recorded. In an eighth step 68 "Personalization" the end user has the option to display names or other content as an overlay graphic on screen, e.g. text, pictures or video. This is akin to adding a visible digital "watermark" to the video to identify the source, such as one's name, etc. In a ninth step 70 "Interact With/Record Process" once the end user is all set up and satisfied with the foreground/background image interaction the resulting video 40 is stored and distributed. In most cases the background Content Creator video 30 "lives" on the end user's computing device allowing the end user to rehearse and interact as many times as desired. However, where the background video 30 is a live streamed broadcast, the end user can interact only for the duration of the broadcast. At anytime end user can choose to record the interaction results so as to be able to play them back. In a tenth step 72 "Optionally record, edit and composite audio and video streams separately" the consumer user can option to record background image 22 and foreground image 34 and their corresponding video and audio files separately. This gives more flexibility and control for the end user to better the quality of the composite, especially in terms of synchronization of audio and video files, color matching and keying. In an eleventh step 82 "Done/Publish" the end user records the interaction and creates a video file available for playback. The end user can then upload the result for others to see, including but not limited to, distribution to the Internet and mobile phones. Users could also choose to record to other media such as a DVD.

The inventive system can also be used for other purposes such as advertising. The basic steps are the same as those already discussed; FIG. 6 is a revised version of FIG. 1 tailored to advertising. In step 28 the template shapes are shown as being geometrical shapes to more effectively accommodate product shapes and product messages. Of course, where spokespersons are involved "human" templates as in FIG. 1 would be appropriate. The other steps operate as described regarding FIG. 1 except that in this case the Advertiser Creator creates the foreground video and provides it to the End User for compositing the video streams.

FIG. 7 shows the process (FIG. 2) configured to relate to advertising. When the intension of Content Creator or Rights Holder is to publish to end user for viewing purposes only, e.g. when the template represents product placement or advertisement, the content creator published file with metadata 46 is made available for the likes of advertisers that can "buy" template advertising space. In this case the advertiser creator is creating the foreground image 55 and publishes 74 this to the End User (customer). This foreground image is then included in the metadata, replacing the template "place holder" from content creator. The template is just a reference and a guide/"place holder" for others to add their content into. In the case of an advertiser the end user's viewing experience may differ based on location, demographics, age, gender and other relevant available information of consumer, or differ based on the content in content creator's background video/image. This allows "custom" and dynamic advertisements to be created "on the fly" to exactly match a demographic—for example, by means of a web page. This method can also be used for flexible product placement in major media releases. For example, Warner Bros is releasing "Batman—The Dark Knight" and on one of the Billboards in Gotham City (within the film) there could be a Coke ad in America and a Nike ad in Europe; teenage girls could see different advertising content than teenage boys, etc. The same applies to the very talented amateurs out there who get millions of hits on their consumer generated videos. Using the present invention they can sell advertisement space within their personal videos and/or pictures, and thus a consumer generated video about their family dog may attract dog food advertisers.

Content creators and rights holders can sell "personalized" advertising template space within their own content, conforming to their creative vision, and thereby obtain profits through revenue sharing. This gives them control over the selection of advertisers, as well as when, where and how ads appear within their content. This will increase income opportunities in previously inaccessible markets. The audience (consumers) can view content without commercial breaks, but with built-in ads that are not intrusive or disruptive to the viewing experience. Consumers can choose to see ad-paid content for free with a clear conscience when they know that the content creators themselves creatively placed the ad and profits when consumers watch it. This makes this method of advertising acceptable to consumers and viewers generally. Advertisers and charities benefit from better visibility when the ad is a creative part of the content. They can tailor ads to a targeted, personal and individual audience by using location-specific language and variations in branding. They can, thus, achieve a presence in markets that have previously been inaccessible.

The Advertisers may include hyperlinks to their messages, thereby allowing the end user in these cases to click on the advertisements which could then open a new window with a message from the advertiser. Advertisers may also, in their messages, include a Near Field Communication NFC system that communicates with display devices and thus allows users to access and receive, for instance, information, gifts or purchase opportunities from advertisements. Significantly, the current invention allows the advertisement to be fetched no matter from where the content creator file is accessed. For example if the Content Creator uploaded the content with metadata through Youtube then the video content with metadata will also be available on Facebook when the file is embedded by somebody on their Facebook site; thus the advertisement follows the file wherever the file goes.

For example, the steps might include:

1. Create an online server database for advertisers on which advertisers, including anybody who has something to sell or comment on, must register and be approved; also charities are welcome to register. As part of the process advertisers complete a questionnaire dealing with the intended target audience including:

A. Location (US, Europe, My City, etc.);
B. Demographics (age, gender, etc.);
C. Consumer online history (search history, habits, etc.);
D. Keyword tags (dog, dance, music, 80's, etc);
E. Additional factors and combinations thereof.

Thereafter the advertiser creates at least one advertisement per template. The End User's software will automatically select and fetch/pull the advertisement that appropriately meets the criteria's of both content creator and advertiser creator.

Next the advertisements with metadata, including hyperlinks, template appearance and target audience are uploaded. Price bundles are then created for the advertiser. For Example, but not limited to: $100 USD per 1,000 hits and/or impressions; $900 USD per 10,000 hits and impressions; $8,000 USD per 100,000 hits and impressions and $70,000 USD per 1,000,000 hits and impressions. Advertisers will then be able to track the hits and select only one content creator if desired.

2. Create an online server for content creators (and/or OEM products to companies such as Youtube, Facebook, MySpace, etc.). Content creators have to register and be approved. Content creators then receive their own content channel and a monetary account such as a Pay Pal account. Content creators also have to complete a questionnaire. They indicate whether to Allow/Disallow Target Advertisers and Charities. Which advertisers and charities are divided into several categories:

Charities:
A. Children rights;
B. Animal rights;
C. Against drugs and alcohol;
D. Against smoking;
E. Preserve the rainforest;
F. Additional categories.
Advertisers:
A. Cars;
B. EI-cars;
C. Drugs;
D. Children;
E. Foods/Drinks;
6. Health;
7. Political;
8. Additional categories.

Next, the content including image/video with metadata (target advertiser, camera/object data, scale, position, template proportions, etc.) is uploaded. Price bundles are created for content creators. For Example, but not limited to: revenue equals 50% of $35 USD per 1,000 hits and impressions. The model is based on Revenue share. Content Creators will be able to track their hits and select only a single advertiser.

The advertising database provides the opportunity for large and small advertisers, e.g. from international brands to local stores and up and coming artists, to demographically target and tailor their message right down to different online computers and IP addresses in the same market. The content database allows content creators and rights holders to dynamically and automatically sell and license the same advertising template space to various clients in any region. The potential return on investment for rights holders is increasing significantly by providing new sales opportunities in markets that have previously been inaccessible, ROI also increase by offering advertisers a targeted and tailored market specific service that delivers better value than conventional marketing approaches.

Because this model is based on revenue share, this invention can provide an opportunity for content creators to allow consumer creators to include copyrighted material in their consumer generated media while content creator and rights holder profit from it. For example, a consumer could opt to use a specific song owned by a famous musician to go with his/her own consumer generated media.

As an example only these steps may include:
As part of the process consumer creators/content creators/rights holders complete a questionnaire dealing with copyright issues including:
A. Are you the copyright owner of this content? Yes or No?
B. If yes—proceed with upload.
C. If no—do you own the rights to part of this content? E.g. Images or Audio.
C.a. If no—who owns the rights?
C.a.i. Are you aware that the copyright owner of this content has the right to all the revenue this content creates and may request it, or request a share of the revenue?
C.a.ii. If yes—proceed with upload.
C.a.iii. If no—We are sorry but you cannot upload this content due to copyright issues.
C.b. If yes—What part of the content do you own and who owns the right to the other part?
C.b.i. Are you aware that the copyright owner of this content has the right to all the revenue this content creates and may request it, or request a share of the revenue?
C.b.ii. If yes—proceed with upload.
C.b.iii. If no—We are sorry but you cannot upload this content due to copyright issues.

As explained above Content Creator metadata 24 which can contribute to a more realistic final result can be obtained in several different ways. FIG. 3 summarizes the steps in the four most common ways of obtaining the metadata 24. In FIG. 3A a Real-Time Camera Tracking method is used. The first step 76 consists of providing camera tracking hardware to produce camera data from the camera during the shoot. The camera can be fitted with either mechanical encoders on all axes of movement or optical encoders that derive data from all axes of movement. All axes of movement include field of view/focal length information of the lens, X, Y and Z positional data and X, Y and Z rotational data. There are several systems available that can read and record camera data from the camera and its related equipment. In the second step 78 the data are translated by a computer device that recognizes the data and creates a replica virtual camera in real time. Real-time tracking techniques make it possible to get 3d information from the on-set camera to allow the insertion of virtual objects (e.g. foreground image) into real footage with the correct position, scale, orientation and motion in relation to the photographed objects in the scene. These solutions are most commonly known as virtual set systems and used frequently in the broadcast industry. The background image can be streamed live and include the camera data transmitted separately to create a real time background/foreground composite interactive broadcast. In the third step 80 the camera metadata are saved together with the shot as metadata 24 and made available for the interactive process at any time after the shoot.

The same idea applies to real-time object tracking in where the metadata are derived through what is called a motion capture system where the camera and object tracking data 78, including positional data and xyz rotational object tracking data, are derived from real-time optical and mechanical, as well as pattern recognition and GPS systems. The object data is stored and made available 80.

FIG. 3B a Software Camera Tracking Match-Moving method is used. In a first step 82 the background image is created and stored. Then in a second step 84 camera data are generated from information in the background image using software that will recognize and calculate positions of pixels in the video image and create camera data based on this pattern recognition method. This is the most commonly used camera tracking method today and used by most blockbuster movies. There are several companies and solutions available that offers this capability which is also called match-moving. Match-moving tools make it possible to extrapolate 3d information from two-dimensional photography, to allow the insertion of virtual objects (e.g., the foreground image) into real footage with the correct position, scale, orientation and motion in relation to the photographed objects in the scene. Again, the final step 86 is to store the created camera metadata 24. As to object software tracking the software 84 extrapolates 2d and/or 3d information from moving objects within the background image 82, by recognizing and calculating positions of pixels of the object within the video image. Then store the created object data 86.

FIG. 3C shows a Computer Graphics Software method. Here, in the first step 88 Computer Graphics software is used to create the Content Creator Video 30. During the second step 90 object and/or camera data are generated by animating objects and/or the virtual camera in computer graphics software. The background image is either rendered as in a video or rendered in real-time, e.g. as a computer game. If rendered as a video the object and/or camera data are saved out separately in a third step 92 for use in the composite/interactive process. If the background image 22 is a computer game then the end user is controlling the camera moves and the software can insert the subject/foreground image where the content creator has specified the template. E.g. the template could be used to replace a computer character's face with your own picture or your own avatar, or be used for randomly updated in-game advertising.

FIG. 3D illustrates the "Eyeballing" Method. Eyeballing is often used in combination with real-time camera tracking and software camera tracking if the match generated by theses solutions was not perfect to start with. Post-production often uses eyeballing to finesse camera data, and this is especially true in software tracking if the camera used zoom during the shot. In a first step 94 the background video image is produced. Then in second step 96 eyeballing is used to create or enhance the metadata. In our case eyeballing might be used by Content Creator to match the template into a background shot where there is no object or camera data available. Content Creator would do this by moving and scaling the template into the most appropriate creative position and timing of the background, or into the most correct possible perspective of the background, in keeping with the creative vision of the Content Creator. In the third step 98 the derived metadata are recorded to/for the Content Creator Metadata 24

Figure 4A:
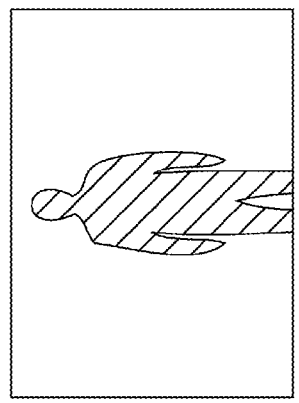
FIG. 4 is a diagram showing how images are positioned relative to templates with FIG. 4A showing a content creator template, FIG. 4B showing an end user template and FIG. 4C showing the interaction between the two templates.
Figure 4B:
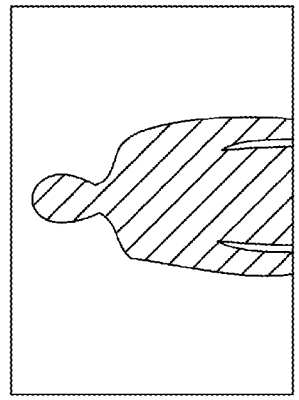
Figure 4C:
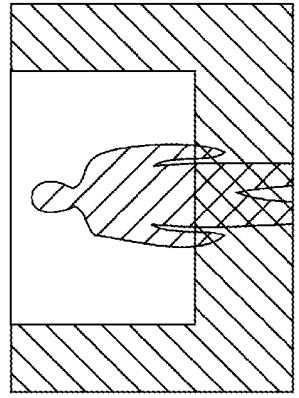

The Consumer Creator has the option to choose an alternate template if the camera and subject cannot be arranged so that the subject fits into the template. An example of this might be if the content creator specified a template that represented a wide angle shot (FIG. 4A), but the Consumer Creator can only achieve a medium shot with the available image creation device (FIG. 4B). In that case, the Consumer Creator could select a medium shot template and fit the subject into it. The software 38 would then position the video image so that it is in the same location as the original template however, since it is a tighter shot, only a portion of the original template would be filled with the foreground image. The rest would be empty as shown in FIG. 4C. Because having a partial subject "float in space" would destroy the illusion that the consumer subject is actually present in the Content Creator video 30, the entire video frame can be cropped to remove the grayed out region shown in FIG. 4C.

The relationship between subject height and the template can be better understood by reference to FIG. 5. When creating a file with which the Consumer Creator (FIG. 5B) can work, the Content Creator (FIG. 5A) selects a template into which the Consumer Creator will fit the subject of the foreground video 34. For example, when the Content Creator selects a template that represented a person, he might specify that the template represents a person who is six feet tall. If the Content Creator specifies a height that the template represents, the Consumer Creator may also specify a height for his or her subject so as to maintain a proper height relation to the background. If the subject were five feet tall then the foreground template polygon would not match and would need to be reduced in size. Let's say that the Content Creator placed the template within his project, and internal to the software the actual height of the template was four graphic units. If the Content Creator specified that the template represented a six foot tall person then each internal unit would equal 1.5 feet. If the Consumer Creator input that the subject is five feet tall then the foreground polygon would then be scaled to 3.333 units in height. The height relationship is correctly maintained because the foreground template polygon is scaled from the floor contact point or top of the subject rather than from its center.

FIG. 5 provides details on how the Content Creator and the Consumer Creator (end user) use information concerning the physical size (height) of the objects in their respective video productions. The process used by the Content Creator is shown in the left side of the figure (FIG. 5A) and consists of a first step 104 "Position and Scale Template" in which the Content Creator selects an appropriate template that best represents a subject within the frame of the image, for example, full figure, medium, medium close or close-up. Then the Content Creator fits the template within background image by moving, scaling, synchronizing and in most cases thereby determines the apparent floor contact point. In a second step 106 "Indicate Height" the Content Creator should indicate the height of the subject if a floor contact point is visible. For example, if a Content Creator is working on a music video and the musician is six feet tall, then it might be appropriate to select the template and indicate that the height is six feet. This is represented diagrammatically at 110. If a floor contact point is not visible in the video, e.g., close up shots, it may not be necessary to enter height information to fit the subject and instead leave the software to perform the subject fitting on screen in the final composite. Final in a third step 108 "Publish" the Content Creator communicates the information that the template is based on a six foot tall subject to the software 26.

The right side of the figure (FIG. 5B) shows the activities carried out by the Consumer Creator. In a first step 116 "Fit Subject Within Template" the Consumer Creator attempts to sets up the camera to fit the video subject (probably himself/herself) into the recommended template. If a fit is possible, the process moves on to the third step 120. The end user may not be able to fit the subject into the suggested template due to limited space at home, camera characteristics or other eventualities. If it is not possible to fit the template, at the second step 118 "Select another template" the Consumer Creator goes through a series of templates until one is found that will fit. A template is selected that more accurately describes the abilities of the local image creating device 32—for example medium close versus full body. Of course, this step 118 may also involve changing the camera position/angle/lens to accommodate the various templates until a fit is found. At the fourth step 120 "If floor contact point is visible" the height of the subject is entered into the software 38. This is shown diagrammatically at 112 where the subject is five feet in height. Item 114 shows the relative relationship between the original six foot template and the five foot subject of the foreground image 34. Without knowing the height of the subject, the software 38 would scale subject to being six feet tall and next to the six foot musician, a five foot subject would look out of proportion. By having the Consumer Creator enter height information the software will automatically scale, position and fit the template to maintain height relation, i.e., the subject will appear to be five feet tall next to the six foot musician. Finally in a fourth step 122 "Publish" the final video 40 will show the subject correctly framed on screen based on height input from Content Creator and Consumer Creator. The software 38 will mathematically adjust the scale and position of the foreground image 34 to maintain the correct height relationship.

FIG. 8 describes the use of templates to maintain accurate proportions of the foreground video when the image format and aspect ratio of the template is known by both content creator and, in this case, advertiser creator. When the image format is available from content creator and used by advertiser creator then the image created by advertiser is not distorted and is in line with both content creator and advertiser creator visions. For example, if a content creator uploads a funny video and believes it is possible to sell the video to advertisers then the software allows you to select a template that describes the image format the advertiser content need to have to be accurately presented within the content creator background image 22.

In FIG. 8A, the process used by content creator consists of a first step 170 "Select, position and scale template" in which the content creator selects the template that is most in line with his/hers creative vision, for example, a square, a rectangle or a circle. Then the content creator fits the template within background image by moving, scaling, synchronizing and, in most cases, determine how, when and where to appear on and off on screen. In a second step 172 "Indicate Aspect Ratio" the content creator should indicate the image proportions of the template used, however in most cases this information is made available by the content creator data file 30 without the need for content creator to enter this information. This is because the Content Creator software 26 has only made a specific number of templates available where the image format for each template is predefined and thus also already known by advertiser creator. In step 176 this is represented diagrammatically where the content creator has selected a template with an 8×1 aspect ratio. Finally in step 174 "Publish" the content creator communicates the information to the advertiser that the template is based on an 8×1 ratio.

The right side, FIG. 8B, shows the activities carried out by the advertiser creator. In a first step 182 "Create foreground image" the advertiser creator creates and prepares an advertisement for each template proportion that is made available in the content creator software 26 and therefore already known to the advertiser creator. Once the advertiser creator software finds (using multiple search criteria such as demographics) an available content with which to associate the advertiser's product, the Content Creator software is able to immediately, dynamically and automatically, select the foreground image with corresponding demographics and identical aspect ratio of the template used by this content creator. In most cases the Advertiser Creators already have prepared multiple versions based on the template sizes and are thus immediately available for the correct content. In a second step 184 "Publish" the advertiser creator publishes his/her advertisement making it available to appear within the content creator video for end users to see 40. The third step 186 "Distortion" emphasizes the importance of the template reference having the same image format as the foreground image. That is when the template and the foreground images have identical aspect/ratios, the end user (the audience) will experience a foreground image that is not distorted and is in line with both the Content Creator's and the Advertiser Creators creative visions. This is diagrammatically represented in 178 and 180A, 180B and 180C. In 176 the content creator has selected a template with an 8×1 ratio. In 178 the advertiser creator has created two foreground images, one with an 8×1 ratio and the other with a 1×1 ratio. In step 180A we see that the foreground image fits perfectly within the template chosen by content creator, where both have identical aspect ratio 8×1. In step 180B and 180C we see that advertiser creator has chosen a 1×1 ratio image to fit with content creator's chosen 8×1 ratio template. There are two ways the system might treat this foreground image. In 180B the image is stretched and distorted to fit within the boundaries of the template even though this was not the intention and creative vision of the advertiser creator. In step 180C the foreground image has kept its proportions in line with the vision of the advertiser, but differs from the creative vision of the content creator. Therefore as explained in relation to step 186 when the template and foreground image have identical aspect ratio the viewer/end user will experience a foreground image that is not distorted and that is in line with both content creator's and advertiser's creative vision.

The use of height and image format information together is best described in FIG. 9. Let's say the Content Creator has created a computer game and encourages multiple users to participate as themselves. The Content creator then creates two or three dimensional computer characters based on ordinary people from children to elders, Asians to Caucasians. Then the Consumer Creator can select the character that best describes himself, enter his height and upload his own image. The template character is then proportionally matched to consumer creator's height in relation to other players, as well as replacing the default image used for the template character's face with consumer creator's face. Hence other players will actually see a very good representation of you and what you really look like when they meet and see you within the game.

Figures 9A, 9B:
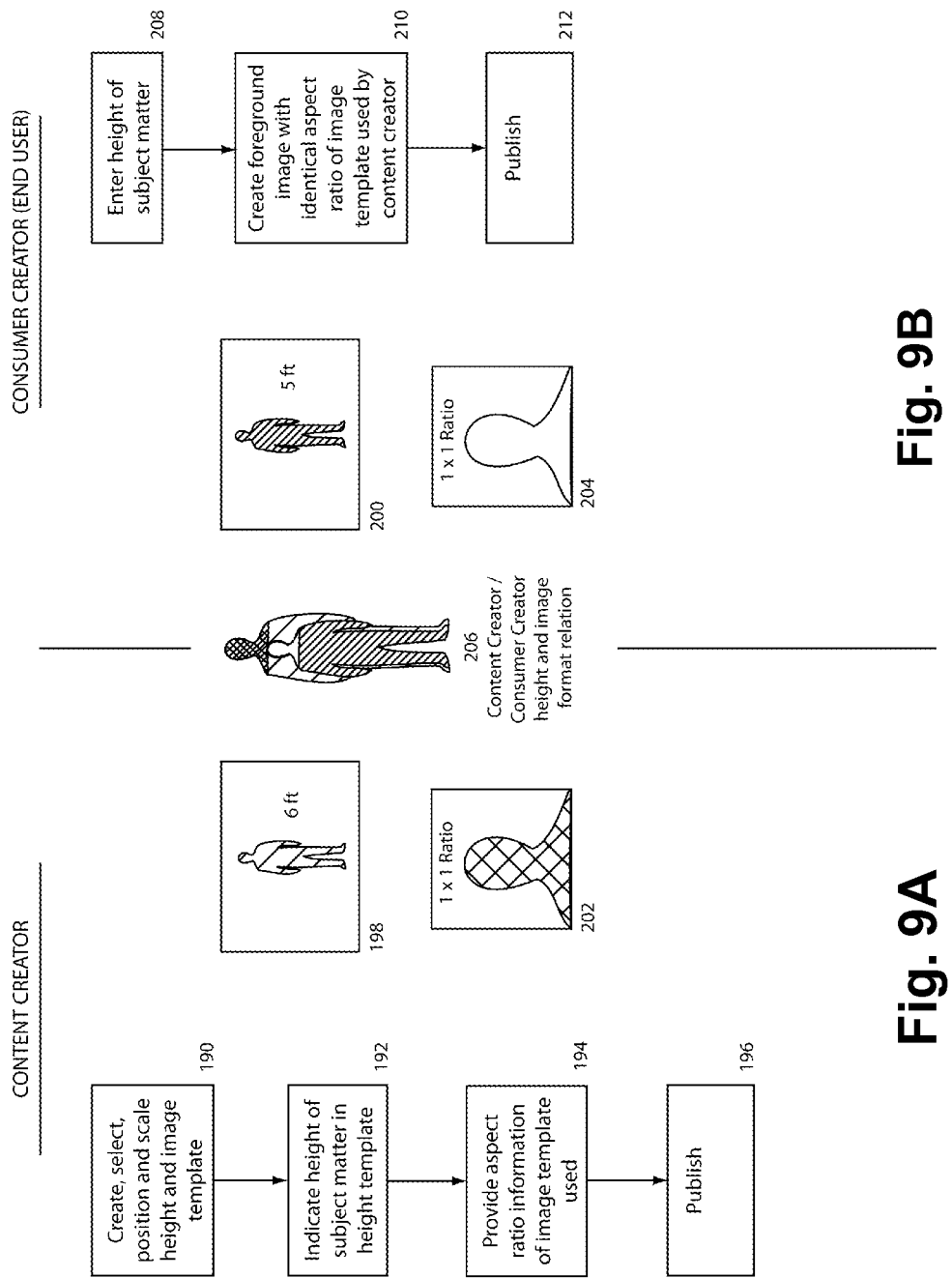
FIG. 9 is an addition diagram explaining the use of height information along with format/aspect information with FIG. 9A showing the content creator aspect and FIG. 9B showing the consumer creator (end user) aspect.

FIG. 9A describes the actions of content creator. In a first step 190 "Create, select, position and scale" the content creator creates, again let's say, a computer character. Within the computer character's full figure content creator selects, positions and scales the fitted image used for the face of the character and makes it a "place holder" for others to insert their own images into. In a second step 192 "indicate height" the Content Creator indicates and defines a default height of the character, as represented diagrammatically in step 198. In a third step 194 "Provide aspect ratio information" the content creator provides information about the image ratio used for the face template, as well as how to fit one's face within the template, as represented diagrammatically at 202. In a fourth step 196 "Publish" content creator publishes this information and makes it available for consumer creator.

FIG. 9B describes the actions of the Consumer Creator. In a first step 208 "Enter height of subject matter" the Consumer Creator enters, using the above example, his or her own height as shown diagrammatically in step 200. In a second step 210 "Create foreground image" the consumer creator match the image ratio of the "face" template as well as match the position of their face within the template, as described diagrammatically at 204. In case Consumer Creators are using their own three dimensional avatar (computer generated face) one may need to give true dimensions of one's head based on real world measurements, say one's head is 10" tall and 7" wide, then this information must be specified by the Content Creator and submitted by Consumer Creator to avoid distortion in the end result. Here it is also important to ensure that the scaling of the object happens from the correct perspective point; e.g. for product placement where the template represents an object sitting on a table one wants the object, e.g. a coke bottle, to be placed on the table as well. In this case scaling it from the floor contact point as described above. In a third step 212 "Publish" the Consumer Creator publishes the information, and as diagrammatically represented in step 206 the relation of this user's computer character is true to your "real world" character in relation to other players of the game.

There are several ways to "publish" information. First the content creator software 26 and the consumer/end-user software 38 should be written using the same programming language (or compatible languages), and be available for all to use. However the programming language may differ depending on the desired result. For example, in case one, where the consumer/end user is able to see and hear themselves interact with others within somebody else's video content, then for best result, with three dimensional capability, the software may be written, but is not limited to, using a combination of C++, graphics (OpenGL or Direct3D) and media playback programming languages. With a simple 2d version containing two or more layers of video information, it may be possible to use only, but is not limited to, Adobe Flash. This is best described above concerning in-video advertising because most online videos today use Adobe Flash for online video playback. In the example concerning gaming and computer generated characters it may be possible to, but is not limited to, use a readily available game engine software, like Quest3D and Unity3D, or build an application from scratch using a combination of C++ and graphics (OpenGL or Direct3D) or openFrameworks. In the final content creator data file 30, as mentioned above, this file/files may include, but are not limited to, video and audio, template information, positional data, height and image format information. There are several formats around like Adobe Flash, AVI, H.264, Theora, Silverlight, HTML5 and Mpeg4 for video, as well as several audio formats like Ogg Vorbis, Mp3 and Aiff. Similarly, other data, like camera data and template data, which is being pushed around can have different text formats and be written in different coding formats, including html, xml, flash, ASCII, binary, etc. However it is of course important that the all the different formats works in unison and understand each other to produce the desired result. The company, e.g. website or distributor, which receives all the uploaded content may convert different video and image formats from content creators to a format of their choice to better the overall process.

Let's take our three examples above and break them down into how they are published in unison, and for the sake of each case lets say they are distributed for the end user to access the files online. In the first case we talk about an end user's/consumer creator's ability to interact, by means of a few simple steps, within a Content Creator's video content. Let's say the Content Creator publishes a video with audio that also has camera movement. The content creator is happy with the tests having placed the templates/themselves into perspective, synchronized the camera data with the video and is ready to publish. The published file references the camera data and recommended template with the video and audio file. Then say the files are uploaded to an Internet server. The Consumer Creator is able to browse a number of video files by looking at thumbnail representations of the videos, search functions like tags and keywords, most viewed, most recent and best rated are available. However in our case the file that is downloaded is not only the video with audio but it also references the information needed to interact with the video. The Consumer Creator software downloads or streams the video and audio as well as the referenced camera data file and template information. The most likely way for this to be done is that when the consumer creator clicks on a thumbnail image of the video, that thumbnail image actually references, and starts to download, a text file that includes or references template information, camera data, reference to location of video and image files, and all the information that the content creator has given for the experience to work to his/hers creative vision. This text file distributes the corresponding files into the representative locations within the end user software. For example, the video with audio file may be found at, for example, www.thisinteractivecompanyserver.com/videos/thisvideo.video. These URL are fictitious examples to show how the information might be arranged for Internet access. Further, the file might include or reference the camera data. If referenced in the file the actual data might be found at, for example, www.thisinteractivecompanyserver.com/cameradata/thiscamera-data.text. The camera data if included or referenced might, but is not limited to, be applied to the consumer creator software as follows: One line item equals one frame of the video. Each line item has information of the camera's movements on each frame and may be separated by a comma or a semi colon, e.g. "frame number, position X, position Y, position Z, rotation X, rotation Y, rotation Z, and field of view (focal length)". The content creator has already synchronized and published the camera data with the video, and the Consumer Creator software therefore knows what line item of camera data goes with what frame in the video, and is applied to the consumer creator software's virtual camera. Further, since the content creator software and the consumer creator software already includes a suite of templates that are the same for both, the text file only needs to include a reference to what template is recommended by content creator. This can be communicated by having each template having a unique number, e.g. the number one (1) equals extreme close up and the number seven (7) equals fully wide. In addition the text file includes information about how, when and where the template does appear within the template. For example, if the camera is moving it may be enough to provide information about the templates scale and position only once per shot. This could be described in the text file where each line item equals every new shot, and every line item includes, but is not limited to, "frame number, number of frames for this shot's duration, scale X, Y, Z, position X, Y, Z, rotation X, Y, Z" of the template. In addition the software will apply its own scale and position based on the height information given by both Content Creator and Consumer Creator which may be referenced in the text file as Height equals in feet; 6'3", or in centimeters; 185. The Content Creator and Consumer Creator software both can include the same capabilities for applying colors and keying to the image and will be executed individually. The same applies to e.g. video and audio delay if necessary.

In the examples concerning The Advertiser the video file and camera data files may be accessed similarly to case number one. Here it may also be possible that the template is following the position of an object in addition to, or without, camera movement, e.g. a poster on a taxi in motion. Similarly the object data file may be found at, for example, www.this-interactivecompanyserver.com/objectdata/thisobject-data.text. The object data if included in or referenced by the content creator's uploaded file may, but is not limited to, be applied to the Consumer Creator software as follows: One line item equals one frame of the video. Each line item has information of the object's moves on each frame and may be separated by a comma or a semi colon, e.g. "frame number, position X, position Y, position Z, rotation X, rotation Y, rotation Z". The Content Creator has already synchronized and published the object data with the video, and the Consumer Creator software therefore knows what line item of object data goes with what frame in the video, and is applied to the Consumer Creator template object. Further, since the Content Creator software and the end user software already includes a suite of templates that are the same for both, the text file only needs to include a reference to what template is used by content creator, achieved simply by calling them for instance 1×1, 8×1, 4×3 or 16×9. In this case it may not be necessary for the advertiser creator to have access to the advertiser creator software 38 except, perhaps, for testing purposes only. The reason is simply that everything can be automated once the content creator uploads the content creator data file 30. This is achieved by Content Creator uploading the file with a reference to a specific file in a specific folder on a server. This "place holder" is constantly pulling/fetching the next available content from the referenced folder on a particular server. For example, www.thisadvertisinqcompanyserver.com/advertisinq/mypreferredadvertisers/ imageformat8x1/available/nextfile.jpg. This folder, which may be located on an advertising company server, is constantly updated with new available content. This could be content from the Coca Cola Company, or it could be content from a charity.

If the template is able to, but not limited to, accept JPEG, PNG and Adobe Flash (.flv) formats, then the instruction is to replace the template "place holder" with the first, random or structured, available content in the folder. In most cases it will be sufficient for Advertiser Creator to only upload one advertisement per template per advertising campaign. The recommended pixel format would be "HD ready", meaning the picture quality of the message should work perfectly in HD format for viewing. When the message is displayed in content in other formats than HD, say iPhone, Youtube or SD resolutions and formats, the system will automatically convert and send the correct pixel format to the content displayed. The conversion to other formats may happen immediately once the advertisement is uploaded to match popular known formats and for then to be automatically available anywhere. Of course an advertiser may only buy a certain number of hits and viewings for a particular advertising campaign' and the advertising server company would then try to negotiate a deal for another advertising campaign or else remove the files from this folder once the advertisement has reached the desired number of hits. The product companies or charity organizations may decide to associate their products or causes based on a number of different categories, e.g. location, demographics, age and gender, keywords, most viewed, best rated, etc. Similarly the Content Creator may decide not to be associated with certain products and organizations, by e.g. checking or un-checking options in provided a questionnaire. This would then become metadata information that will be included in the representative metadata. This invention creates a great opportunity for charities and good causes since the Content Creator may choose to have charities advertise if no one else decides to buy into the content. Also the Content Creator may decide that for e.g. every fifty advertisements shown within their content one must be for a charity of content creator's choice.

An additional example involves the Consumer Creator/end user participating as him/herself (or whomever he/she may choose) in a computer game by choosing a game character (template), entering height information as well as uploading an image of him/herself based on the image format of, and position within, the template recommended by the Content Creator. Due to the nature of some computer games simply put what you don't see the software does not read. This means if the gamer is located in a certain location within the game, something that is very far away and out of view may not be accounted for and may not take much or any processing power or heavy calculations while you play. This is most commonly referred to as Levels of Detail LOD, Discrete Level of Detail DLOD and Hierarchical Level of Detail HLOD. The software knows when to download the necessary graphics elements and this is most often based on the likelihood of these items coming into view. Since the game only has a number of computer characters (templates) that are used again and again it is important that a particular player's character is uniquely identified wherever this character is within the game. Similar to the method used for downloading graphics that may come into view the software can download a gamer's image to his/her fellow game opponents' computing devices when that gamer is getting close to come into view. A player's template image can be uniquely identified with the player's login character and may be located at, for example, www.thisgamecompany.com/thisgame/thischaracter/thisface/myimage.jpg. Similarly it will be possible automatically to connect the player and his/her chosen opponents through VoIP (voice over internet protocol) or internet chat. This can be achieved by characters being close in distance (e.g. six feet/two meters) to each other and having agreed to accept communication with others. For example, the content creator/ game company may create a VoIP zone based on actual in-game measurements.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A method for creating new video content by compositing two video streams in real time to create new video content comprising the steps of:
   using software to manually insert at least one template which appears as an outline shape into a video;
   adjusting the at least one template by positioning and scaling it into a desired position which represents both a physical location and a temporal location within the video thereby creating a first video stream wherein the at least one template includes embedded metadata selected from the group consisting of positional information, timing information, location information, scaling information and size information so that the template controls where and when a second video stream will be composited into the first video stream;
   creating the second video stream so that a subject of the second video stream is compatible with the outline shape of the at least one template; and
   using software to composite the first video stream and the second video stream in real time so that the second video stream fills the at least one template according to the metadata so that the second video stream appears to be part of the first video stream, thereby creating new video content for viewing by an end user.

2. The method according to claim 1 further comprising a step of distributing the first video stream.

3. The method according to claim 1 further comprising a step of distributing the second video stream.

4. The method according to claim 1, wherein the composited second video stream is in the foreground of the new video content and the first video stream furnishes the background of the new video content.

5. The method according to claim 1, wherein composited second video stream is in the background of the new video content and the first video stream furnishes the foreground of the new video content.

6. The method according to claim 1, wherein the video is produced by using physical image capture devices to image physical objects.

7. The method according to claim 1, wherein the video is produced by using virtual image capture devices to image software created objects.

8. The method according to claim 1, wherein the step of inserting comprises inserting a plurality of templates.

9. The method according to claim 1, wherein the embedded metadata describe positional information of image capture devices used in producing the video including camera shot, camera positional and rotational information.

10. The method according to claim 1, wherein the step of creating the second video stream includes providing metadata describing positional information of an image capture device used to create the second video stream.

11. The method according to claim 1, wherein the step of creating the second video stream includes providing metadata describing the demographics of the end user.

12. The method according to claim 1, wherein the step of viewing the first video stream further comprises selecting one template from a plurality of templates contained in the first video stream.

13. The method according to claim 1, wherein the end user does not carry out the step of creating the second video stream.

14. The method according to claim 1 further comprising the step of distributing the new video content.

\* \* \* \* \*